(12) United States Patent
Russell et al.

(10) Patent No.: US 11,808,382 B2
(45) Date of Patent: Nov. 7, 2023

(54) DOUBLE JACKETED, HIGH TEMPERATURE FIRE HOSE

(71) Applicant: AAH HOLDCO, LLC, Union City, PA (US)

(72) Inventors: Jeff Russell, Union City, PA (US);
David Wilkins, Union City, PA (US);
Bob Maleski, Union City, PA (US)

(73) Assignee: AAH HOLDCO, LLC, Union City, PA (US)

( * ) Notice: Subject to any disclaimer, the term of this patent is extended or adjusted under 35 U.S.C. 154(b) by 0 days.

(21) Appl. No.: 17/887,715

(22) Filed: Aug. 15, 2022

(65) Prior Publication Data

US 2022/0390046 A1    Dec. 8, 2022

Related U.S. Application Data

(63) Continuation of application No. 16/878,718, filed on May 20, 2020, now Pat. No. 11,415,245.

(51) Int. Cl.

| | | |
|---|---|---|
| *F16L 11/12* | (2006.01) | |
| *B32B 15/14* | (2006.01) | |
| *B32B 19/04* | (2006.01) | |
| *B32B 15/06* | (2006.01) | |
| *B32B 15/20* | (2006.01) | |
| *B32B 25/04* | (2006.01) | |

(52) U.S. Cl.
CPC .......... *F16L 11/125* (2013.01); *B32B 15/06* (2013.01); *B32B 15/14* (2013.01); *B32B 15/20* (2013.01); *B32B 19/041* (2013.01); *B32B 25/04* (2013.01); *B32B 2307/306* (2013.01); *B32B 2311/24* (2013.01); *B32B 2367/00* (2013.01); *B32B 2597/00* (2013.01)

(58) Field of Classification Search
CPC ........ F16L 11/125; B32B 15/06; B32B 15/14; B32B 15/20; B32B 19/041; B32B 25/04; B32B 2307/306; B32B 2311/24; B32B 2367/00; B32B 2597/00
USPC ......................................................... 138/125
See application file for complete search history.

(56) References Cited

U.S. PATENT DOCUMENTS

| | | | |
|---|---|---|---|
| 6,158,476 A | 12/2000 | Sjotun | |
| 7,085,458 B2 | 8/2006 | Morris | |
| 8,327,887 B2 | 12/2012 | Lockhart | |

(Continued)

FOREIGN PATENT DOCUMENTS

| | | |
|---|---|---|
| CN | 206072576 U | 4/2017 |
| JP | 3825833 | 9/2006 |
| KR | 1020170062769 A | 6/2017 |

OTHER PUBLICATIONS

Barolli et al., Conductive, Convective, and Radiative Heat Performance Testing of Fire Attack Hoses, Worcester Polytechnic Institute, Apr. 20, 2016.

*Primary Examiner* — Craig M Schneider
*Assistant Examiner* — David R Deal
(74) *Attorney, Agent, or Firm* — McDonald Hopkins LLC

(57) ABSTRACT

An attack fire hose capable of withstanding radiant and convective heating without leakage or degradation of performance for significant periods of time is disclosed. The hose includes a woven aramid blend of fibers in the outer jacket, and a rubber-like material layer is extruded through the weave of an inner nylon/polyester jacket that is fitted within the woven outer jacket. The resultant hose retains a double jacketed construction with exceptional thermal performance.

17 Claims, 1 Drawing Sheet

(56) References Cited

U.S. PATENT DOCUMENTS

| | | |
|---|---|---|
| 8,894,786 B2 | 11/2014 | Lockhart |
| 9,040,133 B2 | 5/2015 | Schubert |
| 2004/0132364 A1 | 7/2004 | Wulliman |
| 2014/0248814 A1 | 9/2014 | Handermann |
| 2015/0308589 A1 | 10/2015 | Krager |
| 2017/0204250 A1 | 7/2017 | Kasowski |
| 2021/0206134 A1 | 7/2021 | Ryder |
| 2022/0018469 A1 | 1/2022 | Russell |

DOUBLE JACKETED, HIGH TEMPERATURE FIRE HOSE

CROSS-REFERENCE TO RELATED APPLICATIONS

This application is a continuation of U.S. Utility application Ser. No. 16/878,718 filed on May 20, 2020 and titled "DOUBLE JACKETED, HIGH TEMPERATURE FIRE HOSE," which is incorporated herein by reference in its entirety.

TECHNICAL FIELD

The present invention relates to hoses designed to withstand high temperatures and, more particularly, to an "attack" fire hose—as well as a method of making the same—having continuous strand, para- and meta-aramid blend yarn woven into an outer jacket with an inner jacket designed using through-the-weave, extruded nitrile rubber extruded simultaneously along the inner and outer facings of that inner jacket. Subsequently, the inner jacket is slid into the outer jacket, thereby providing an attack hose with superior performance.

BACKGROUND

Attack hoses designed to deliver high volume and/or high pressure water are critical pieces of fire fighting equipment. These hoses must be designed for regular and repeated use, while simultaneously withstanding radiative and convective heat, as well as direct flame impingement. Further considerations such as resistance to rot, weight per unit length, and flexibility/stretch-ability also must be factored in when designing such hoses. Lastly, regulatory bodies, such as the National Fire Protection Association standard on fire hoses (NFPA 1961-2019), impose limitations on the selection of materials and the performance of hose constructions under specific conditions.

U.S. Pat. Nos. 8,327,887 and 8,894,786 (both incorporated by reference herein) provide further insights into considerations for fire hose design. These documents exemplify considerations that go into selecting and weaving materials, and they demonstrate that certain design features cannot always be easily or arbitrarily substituted in a given design.

"Attack hoses" are particular class of exceptionally high performing hoses. These hoses are often relied upon at the initial point of attack in firefighting scenarios, so that they demand significant tolerance to all forms of thermal and physical stress. For purposes of this disclosure, an attack hose is a water/fluid delivery hose specifically designed to combat fires beyond their incipient stage. Attack hoses must sustain operating pressures of at least 300 psi (20 bar), thereby making them significantly more rugged than supply hoses.

United States Patent Publication 2004/0132364 describes a flame and burn-through resistant polymeric film made of aramid fibers, mica flakes, and an aramid fibrid binder. The film is also resistant to water vapor transmission. The film may be used as a laminate sheet that can be heat or ultrasonically sealed to other substrates.

United States 2015/0308589 contemplates a flexible conduit designed to contact fire suppression fluids. A jacket layer surrounds a core layer, with a mesh-like reinforcing layer situated between the two. The jacket can be a fire retardant (e.g., polyurethane), whereas the core is formed from polyethylene or nylon. The reinforcing layer can be polyester fiber weave or aramid fibers that may be partially embedded in the jacket and/or the core, effectively forming a three-layered laminate.

Japanese Patent 3825833B2 describes a fire extinguishing hose with improved heat resistance. It includes an inner lining of a cylindrical woven fabric layer and a sealing layer of a thermoplastic elastomer (e.g., polyurethane, polyethylene, etc.). The woven fabric layer may a spun yarn formed of thermoplastic fibers (e.g., polyester, nylon, etc.) and aramid fibers.

All of the aforementioned patent documents are incorporated by reference. Further, to the extent compatible with the description below, further aspects of the invention may incorporate one or combinations of the features found in these conventional designs.

Separately, All-American Hose LLC (Union City, Pa.) sells a number of attack and other fire hoses under its brands, Snap-tite, Ponn, and National Fire Hose. These products currently include: polyester double-jacketed hoses (e.g., CONQUEST, 8D, SUPREME (FS)); nylon double-jacketed hoses (e.g., TRIPLE DUTY, N-DURA, DURA-PAK); extruded or 3-ply nitrile rubber hoses (LD, TPX, ATX); jacketed, extruded through the weave nitrile hoses (GLADIATOR, HFX). While each of these products is tailored for performance and cost, none currently deliver the highest possible thermal performance under NFPA 1961-2019.

In view of the foregoing, an attack hose having superior conductive and radiative thermal performance, able to maneuver in tight structure fire spaces, acceptable weight and cost considerations, is needed.

SUMMARY OF INVENTION

In various aspects, this attack hose construction begins with an extrusion process in which nitrile rubber is simultaneously pushed through both the inner and outer surfaces of a nylon and/or polyester inner jacket. The resultant tube is inserted into an outer jacket made from a woven fabric of filament yarn (continuous strands) of a blend of para- and meta-aramid fibers. This "through the weave" manufacture of the inner jacket results in a laminate structure in which the nitrile rubber serves as both an inner liner and intermediary cover disposed between the inner and outer jackets. Under pressure, the inner jacket expands uniformly to contain the water while engaging with the outer jacket. In some embodiments, a heat-reflective film may be interposed between the inner and outer jackets, so as to further enhance the thermal performance of the hose.

In certain aspects, the invention may include any combination of the following features:
  A woven outer jacket made from continuous strands of para- and meta-aramid fibers;
  An expandable polymeric liner comprising nitrile rubber provided around an inner weave;
  A heat-reflective film including a metallic or semi-metallic material interposed between the woven outer jacket and the expandable inner polymeric liner;
  Wherein the heat-reflective film comprises biaxially-oriented polyethylene terephthalate film onto which the metallic or semi-metallic material is deposited;
  Wherein the metallic or semi-metallic material is deposited on a backing mat made from at least one selected from: fibrous glass, para- and/or meta-aramid fibers, polyester, nylon, biaxially-oriented polyethylene terephthalate high-temperature polymeric material, and combinations thereof;

Wherein the metallic or semi-metallic material is disposed on the backing mat by way of physical vapor deposition;

Wherein the metallic or semi-metallic material includes one or more selected from: aluminum, titanium, zirconium, carbon, silicon, and combinations of one or more of the foregoing; Wherein the metallic or semi-metallic material includes aluminum;

Wherein the inner weave comprises at least one of nylon fibers and polyester fibers;

Wherein the continuous strands form a yarn;

Wherein the para-aramid fibers consist of essentially poly-paraphenylene terephthalamide;

Wherein the meta-aramid fibers consist essentially of poly-m-phenylene isophthalamide;

Wherein the expandable polymeric liner has an inner and outer facing of the inner woven jacket both of which completely encase the inner woven jacket;

Wherein the inner and outer facings consist essentially of identical polymeric material;

Wherein the expandable polymeric layer and/or nitrile rubber is extruded through the weave around the inner woven jacket; and Wherein an outer-most facing of the inner woven jacket consists essentially of an identical material in relation to the expandable inner polymeric layer comprising an inner facing of the inner woven jacket.

Additionally, methods of manufacturing any of the aspects of the preceding paragraph are also contemplated. Here, the woven inner jacket is first formed, followed by extruding the polymeric liner material through the weave of the outermost jacket to form a laminate hose. Further, the resultant hose is inserted into the outer jacket and then pressurized so as to create a temporarily unitary hose in which the expandable inner liner moves in concert with the woven outer jacket. As above, an optional step prior to pressurization includes providing a heat-reflective film on the inner lumen of the woven outer jacket (or along the outer facing of the inner jacket after the nitrile is extruded through the weave). Notably, and extruding through the weave disposes the same material on the inner and outer facings of the inner jacket.

Still other aspects of the invention are disclosed and discernible to those having skill in this field. In this regard, specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings and attachments, all of which are incorporated as part of this disclosure:

FIG. 2A shows the hose in a relaxed state, whereas FIG. 2B illustrates a pressurized hose and, separately, a laminar or multi-ply hose including a heat-reflective intermediate layer. These figures are not necessarily drawn to scale.

DETAILED DESCRIPTION

Figure 1:
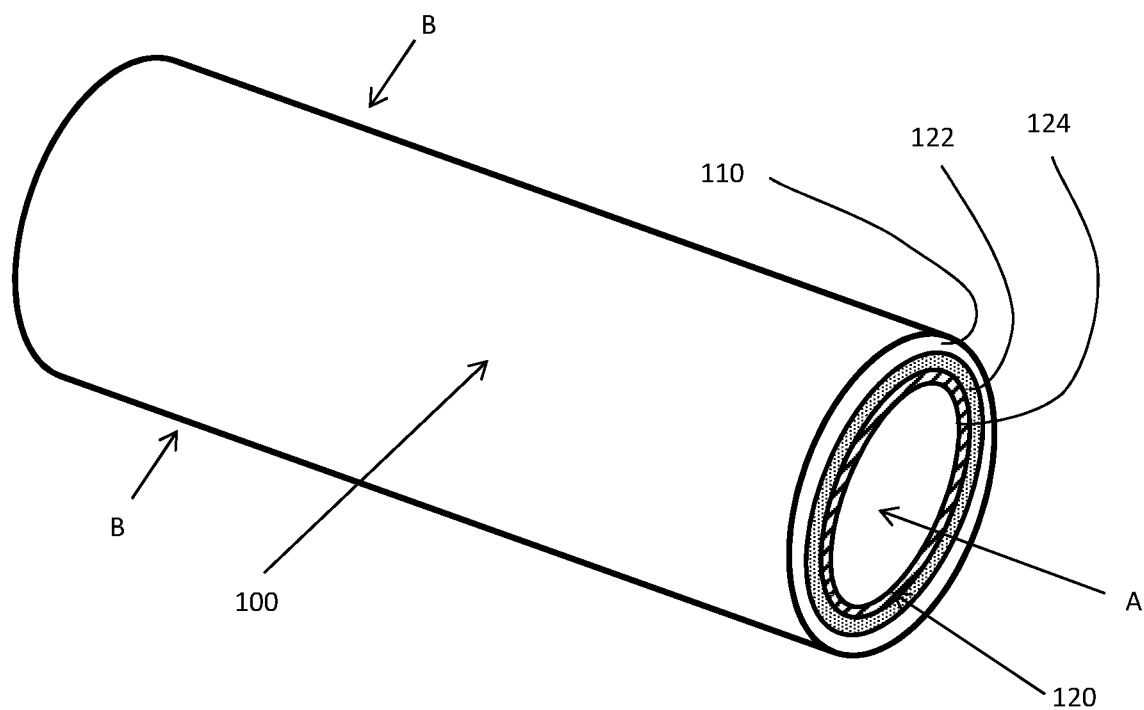
FIG. 1 is a three dimensional, perspective view illustrating the cross sectional construction of a hose according to certain embodiments of the invention.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Any descriptions and drawings in this disclosure, and any written matter within the drawings, should be deemed to be reproduced as part of this specification.

Since their commercial introduction in 1961, aramid fibers have been prized for their lightweight form and structural strength. Generally speaking, these fibers are polymerized chains of poly(phenylene terephthalamide). These polymers are further characterized by the location of the polymer linkage, with poly-paraphenylene terephthalamide, or para-aramid fibers, being sold commercially as Kevlar® and poly-m-phenylene isophthalamide, or meta-aramid fibers, being sold commercially as Nomex®. Para-aramids may be further classified as standard tenacity (e.g., Kevlar®) or high modulus (e.g., Heracron®), either or both of which may be incorporated into certain aspects.

Each of these classes of aramid fibers are flame resistant and exhibit low thermal shrinkage, low electrical conductivity, low elongation to break, and high chemical resistance. However, meta-aramids tend to have lower tensile strength, higher elongation, and greater solubility in comparison to para-aramids. In order to realize the benefits of both classes, it is possible to create composite blends of para- and meta-aramid. Table 1 provides comparative insights on specific types of aramids, each identified by its commercial name.

TABLE 1

Exemplary aramid fiber characteristics

| Brand name | Type | Density (g/cm³) | % Elongation |
| --- | --- | --- | --- |
| Kevlar 149 | Para- | 1.47 | 1.5 |
| Kevlar 49 | Para- | 1.45 | 2.8 |
| Kevlar 129 | Para- | 1.45 | 3.3 |
| Kevlar 119 | Para- | 1.44 | 4.4 |
| Nomex | Meta- | 1.38 | 22 |

A composite of para- and meta-aramid fiber is provided in filament (continuous strand) yarn and woven into 1500-5 ply, 1.65 twist/inch cylindrical jacket. The ratio of para- to meta-fibers, on a weight basis, should be between 50% to 100% and 0% to 50% respectively speaking. A preferred material has ~50% para-aramid and ~50% meta-aramid fibers. Preferred sources and grades include any combination of two or more of: Kevlar 29 (DuPont), Kevlar 49 (Dupont), Nomex (Dupont), Twaron (Teijin), Technora (Teijin), Alkex® AF1000 (Hyosung), Heracron® HF200 (Kolon), as well as any of the other materials disclosed in Table 1.

In some aspects, the outer jacket forms the outermost layer of a laminar or ply construction. Specifically, the outer jacket is very dense and durable, so as to protect the inner jacket. In turn, the inner jacket is porous to allow for penetration of rubber thru-the-weave. In an exemplary embodiment involving hose diameter of 1.75 inches, the outer jacket is woven to have 176 ends of 1500 denier 5 ply aramid blend warp (lengthwise) yarn and 41 picks per 4" of 1000 denier 6 ply aramid blend filler (radial/transverse) yarn, while the inner liner jacket has 192 ends of 840 denier 2 ply nylon warp yarn and 48 picks per 4" of 1680 denier 3 ply nylon filler yarn. The picks and ends of these weaves may be adjusted in a proportional manner to accommodate larger or smaller hose diameters (e.g., a three and a half inch diameter hose would have approximately double the number of ends and picks).

In additional aspects, 1000 and 2250 denier blended aramid yarn could be used in the warp and filler yarns of the outer jacket. In this manner, the warp yarn could vary from 165 to 196 ends, with 176 and 188 ends also contemplated in that range, with 3, 5, 7, or 8 ply construction. In turn, the filler yarn could have 36.5 picks to 41 picks with 3, 4, or 6 ply. Similarly, the inner jacket yarns (warp and filler) could also be 630 or 1820 denier, with 192 ends (warp) at 2 ply and 48 picks (filler) or 3 or 6 ply. These values are exemplary, and additional, complimentary weave characteristics (based on warp and filler denier, picks, ends, and/or ply) are still possible.

Nitrile rubber is then extruded onto this woven inner jacket. In particular, a through the weave extrusion process is utilized in which the jacket runs though the rubber extrusion head. This approach simultaneously coats the jacket on the inside and outside with nitrile rubber. Alternative extrusion materials may include ethylene propylene diene monomer rubber (EPDM), mixtures of EPDM and styrene butadiene rubber (SBR), polychloroprene (e.g., Neoprene), and other nitrile rubber derivative compounds, depending upon the precise nature of the desired performance characteristics.

Figure 2A:
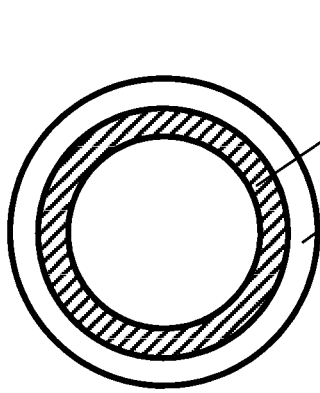
FIGS. 2A and 2B are cross sectional views taken along line B-B in FIG. 1 so that the depiction is orthogonal to the hose longitudinal axis A.
Figure 2B:
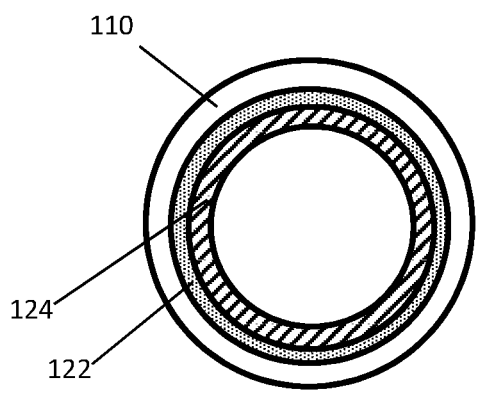

Notwithstanding this initial extrusion, the inner and outer jackets move independently until the hose assembly is pressurized. The inner liner will expand until it meets the outer jacket. When this contact occurs, the two jackets form a mechanical bond that works together to hold the pressure and conduct the fluid. FIG. 2A shows a cross sectional view of an exemplary inventive hose 100 in which the outer jacket 110 is separated from the inner jacket 120. When subjected to pressure, as shown in FIGS. 1 and 2B, lining 120 includes an expansion zone 122 in which the inner layer 124 engages with the jacket 110. In some embodiments, expansion zone 122 coincides with where a heat-reflective layer may be positioned to further improve thermal properties and durability (i.e., 122 is also representative of the positioning and placement of the heat reflective layer).

When provided, this heat-reflective layer is from metallic or semi-metallic material. The material may be one or more layers provided as a foil and/or disposed on a backing mat made from at least one selected from: fibrous glass, para- and/or meta-aramid fibers, polyester, nylon, biaxially-oriented polyethylene terephthalate high-temperature polymeric material, and combinations thereof. When the metallic or semi-metallic material may be deposited onto the backing mat by way of physical vapor deposition.

Exemplary metallic or semi-metallic material include one or more selected from: aluminum, titanium, zirconium, carbon, silicon, and combinations of one or more of the foregoing. Alloys, polymorphs, nitrides, and/or oxides of these materials can also be used alone or in combination. Preferred materials for purposes of an intermediate layer include aluminum deposited onto a biaxially-oriented polyethylene terephthalate film having a thickness of at least about 10-25 microns (~0.5-1.0 mils), 125 microns (5 mils), and up to 350 microns (14 mils) or more.

Standard hose lengths would be 50' or 100'. The preferred flat width would be 3⅝", with preferred 500 PSI Service, 1000 PSI Proof and 1500 PSI Burst Pressure ratings. Comparative testing below was conducted on hoses having these (or comparable) dimensions and ratings.

Whether provided as woven jacket and extruded through the weave nitrile liner or a woven jacket with a heat-reflective film interposed between the jacket and the liner, when the resultant hose is subjected to pressure (i.e., water or other fluid is passed along its inner-most lumen), the fluid pressure causes the inner liner to expand and come into intimate contact with film/outer jacket. In this manner, the pressurized hose behaves as a unitary object, but it retains the flexibility, strength, and superior thermal characteristics of its constituent layers/components, thereby making it an ideal attack hose. When pressure is relieved, the inner liner may move freely within the lumen defined by the outer jacket, thereby making for a lightweight and easy to handle hose.

Radiant and conductive heat testing according to UL methodologies was conducted on various conventional hoses having a double jacketed construction with an nitrile rubber liner (glued or calendar backed) and a polyester outer jacket. The inventive Para/Meta aramid yarn outer jacket with through the weave nitrile rubber lasted 110% longer than the best performing conventional hose during radiant heat testing (3 minutes 16 seconds to 1 minutes 33 seconds) and over 12,000% higher than highest competitor hose during conductive testing (15 minutes to 7 seconds).

Similarly, current UL published results for radiant and conductive heat testing for conventional hoses with a double jacketed construction with a polyurethane or Mertex lining and a polyester outer jacket indicate the inventive hoses herein last 65% longer than the best performing conventional hose during radiant heat testing (3 minutes 16 seconds to 1 minutes 59 seconds) and over 6,823% higher than highest competitor hose during conductive testing (15 minutes to 13 seconds).

Further aspects of the invention may be discerned from careful study of the features illustrated in the drawings. While structures that are most pertinent to the operation of the hose are highlighted above, still further functions and structures will be appreciated by skilled persons upon studying the drawings in their entirety, particularly with respect to substitution of materials and methods of manufacture.

In addition to providing structural integrity and desired thermal performance, the materials should also be selected for workability, cost, and weight. Various standard testing methods, particularly those established by American National Standards Institute (New York, N.Y.), UL (Northbrook, Ill.) and/or the National Fire Protection Association (Quincy, Mass.), may be useful in characterizing the components and/or overall performance of the invention contemplated herein. In particular, the testing regimes for NFPA1961-2019 is useful and incorporated by reference herein.

Materials selection in fire hoses—and particularly in attack hoses—is a complex endeavor. While certain chemical compounds may display desired traits (e.g., good thermal tolerance), some of these compounds may not be amenable to manufacturing processes and/or may not possess other key traits (e.g., structural integrity). Therefore, in the foregoing disclosure, it will be understood that materials selection, processing techniques, and resultant hoses involve highly specialized considerations in which substitutions and changes may not be feasible or readily apparent to those skilled in in this field.

Nevertheless, it is also understood that the invention may not to be limited only to the embodiments disclosed. Some modifications, substitutions, and alterations are possible without departing from the scope of the appended claims or the equivalents thereof

What is claimed is:

1. A firefighting hose capable of laying flat when not pressurized by water flowing therethrough, the hose consisting of:
   an outer jacket woven from continuous strands of para- and/or meta-aramid fibers;
   an expandable polymeric liner comprising an inner jacket of woven fibers configured to create pores therethrough and a material extruded through the pores of the inner jacket so as to fill the pores and cover an inner and/or outer facing of the inner jacket, wherein the material is at least one selected from: ethylene propylene diene monomer rubber (EPDM), mixtures of EPDM and styrene butadiene rubber (SBR), and polychloroprene; and
   wherein the outer jacket and the inner jacket move independently except when the firefighting hose is pressurized.

2. The hose of claim 1 wherein the woven fibers comprise nylon and/or polyester fibers.

3. The hose of claim 1 wherein the continuous strands form a yarn.

4. The hose of claim 3 wherein the yarn has a denier between 1000 and 2250.

5. The hose of claim 1 wherein the para-aramid fibers consist essentially of poly-paraphenylene terephthalamide.

6. The hose of claim 1 wherein the meta-aramid fibers consist essentially of poly-m-phenylene isophthalamide.

7. A firefighting hose capable of laying flat when not pressurized by water flowing therethrough, the hose consisting of:
   an outer jacket woven from continuous strands of para- and/or meta-aramid fibers;
   an expandable polymeric liner comprising an inner jacket of woven fibers configured to create pores therethrough and a material extruded through the pores of the inner jacket so as to fill the pores and cover an inner and/or outer facing of the inner jacket, wherein the material is at least one selected from: ethylene propylene diene monomer rubber (EPDM), mixtures of EPDM and styrene butadiene rubber (SBR), polychloroprene, and nitrile rubber; and
   wherein the outer jacket and the inner jacket move independently except when the firefighting hose is pressurized; and
   wherein the material covers the outer facing of the inner jacket so that, as the inner jacket expands uniformly the firefighting hose is pressurized, the material engages the outer jacket, thereby producing unitary, laminate structure in which the material separates the inner and outer jackets.

8. The hose of claim 1 wherein the woven outer jacket has warp yarn with between 165 and 196 ends and filler yarn with between 36.5 and 41 picks.

9. The hose of claim 1 wherein inner woven jacket has warp yarn with about 192 ends and filler yarn with about 48 picks.

10. The hose of claim 1 wherein the firefighting hose has a length between fifty and one hundred feet.

11. The hose of claim 1 wherein the firefighting hose has a flat width greater than 3 inches.

12. The hose of claim 1 wherein the firefighting hose has a burst pressure rating of at least 1500 pounds per square inch.

13. The hose of claim 1 wherein the firefighting hose sustains operating pressures of at least 300 pounds per square inch.

14. A firefighting hose capable of laying flat when not pressurized by water flowing therethrough, the hose comprising:
   an outer jacket woven from continuous strands of para- and/or meta-aramid fibers;
   an expandable polymeric liner comprising an inner jacket of woven fibers configured to create pores therethrough and a material extruded through the pores of the inner jacket so as to fill the pores and cover an inner and/or outer facing of the inner jacket, wherein the material is at least one selected from: ethylene propylene diene monomer rubber (EPDM), mixtures of EPDM and styrene butadiene rubber (SBR), and polychloroprene; and
   a heat-reflective film including a metallic or semi-metallic material interposed between the outer jacket and the expandable inner polymeric liner.

15. The hose of claim 14 wherein the heat-reflective film comprises biaxially-oriented polyethylene terephthalate film onto which the metallic or semi-metallic material is deposited.

16. The hose of claim 14 wherein the metallic or semi-metallic material is deposited on a backing mat made from at least one selected from: fibrous glass, para- and/or meta-aramid fibers, polyester, nylon, biaxially-oriented polyethylene terephthalate high-temperature polymeric material, and combinations thereof.

17. The hose of claim 14 wherein the metallic or semi-metallic material includes one or more selected from: aluminum, titanium, zirconium, carbon, silicon, and combinations of one or more of the foregoing.

* * * * *